(12) United States Patent
Kucharczyk et al.

(10) Patent No.: US 10,684,378 B2
(45) Date of Patent: Jun. 16, 2020

(54) X-RAY DETECTOR AND TECHNIQUE OF CONTROLLING THE X-RAY DETECTOR

(71) Applicant: Rigaku Corporation, Tokyo (JP)

(72) Inventors: Damian Kucharczyk, Wroclaw (PL); Mathias Meyer, Wroclaw (PL)

(73) Assignee: Rigaku Corporation, Tokyo (JP)

( * ) Notice: Subject to any disclaimer, the term of this patent is extended or adjusted under 35 U.S.C. 154(b) by 93 days.

(21) Appl. No.: 16/018,491

(22) Filed: Jun. 26, 2018

(65) Prior Publication Data

US 2019/0011579 A1 Jan. 10, 2019

(30) Foreign Application Priority Data

Jul. 5, 2017 (EP) ..................................... 17179774

(51) Int. Cl.
 *G01T 1/24* (2006.01)
 *G01N 23/20008* (2018.01)
 *G01T 1/29* (2006.01)
 *G01T 1/17* (2006.01)

(52) U.S. Cl.
 CPC ....... *G01T 1/243* (2013.01); *G01N 23/20008* (2013.01); *G01T 1/17* (2013.01); *G01T 1/244* (2013.01); *G01T 1/29* (2013.01); *G01T 1/2907* (2013.01); *G01N 2223/501* (2013.01)

(58) Field of Classification Search
 CPC ......... G01T 1/243; G01T 1/29; G01T 1/2907; G01T 1/244; G01T 1/17; G01N 23/20008; G01N 2223/501
 See application file for complete search history.

(56) References Cited

U.S. PATENT DOCUMENTS

| 2011/0007869 A1* | 1/2011 | Gendreau | ............... G01N 23/20 378/46 |
| 2013/0315376 A1* | 11/2013 | Safai | .................... G01N 23/203 378/87 |

FOREIGN PATENT DOCUMENTS

| CA | 628 280 A | 10/1961 |
| WO | WO 2016/123688 A1 | 8/2016 |

OTHER PUBLICATIONS

European Search Report dated Oct. 30, 2017.

* cited by examiner

*Primary Examiner* — Michael C Bryant
(74) *Attorney, Agent, or Firm* — Dickinson Wright PLLC

(57) ABSTRACT

An X-ray detector includes at least two X-ray detector modules which are articulately connected to one another; a drive mechanism configured to position the at least two articulately connected X-ray modules around the sample; a control unit configured to control the drive mechanism to move the at least two detector modules relative to one another such that the at least two detector modules are arranged around the sample along a pre-calculated curved line having a curvature that depends on a selected distance between the detector and the sample. Also provided is an X-ray analysis system comprising the above X-ray detector and a method of controlling the X-ray detector.

16 Claims, 11 Drawing Sheets

X-RAY DETECTOR AND TECHNIQUE OF CONTROLLING THE X-RAY DETECTOR

PRIORITY CLAIM

This application claims the benefit of priority from European Patent Application No. EP 17 179 774 filed Jul. 5, 2017, which is hereby incorporated by reference in its entirety.

BACKGROUND

1. Field of the Invention

The present invention generally relates to the field of X-ray analysis. More particularly, the invention relates to an X-ray detector for use in an X-ray analysis system and a corresponding X-ray analysis system for measuring X-ray beams diffracted by a sample to be investigated.

2. Description of Related Art

X-ray analysis techniques, such as X-ray diffraction (XRD) have become very popular because they employ a non-destructive analysis of samples. For instance, X-ray diffraction has become one of the fundamental experimental techniques for investigating structural properties of crystalline, polycrystalline or powder samples.

The general principle of X-ray diffraction is as follows: A monochromatic beam of X-rays is generated by an X-ray source. The generated X-ray beam is collimated and directed onto a sample to be investigated by a corresponding X-ray optics. The incident X-ray beam is diffracted by the sample and the diffracted beams are detected by a corresponding detector. A diffraction pattern can be obtained by varying the incidence angle of the incident X-ray beam and measuring at the same time the diffracted beams at the different incidence angles. A variation of the incidence angle can be obtained by either rotating the sample relative to the incident X-ray beam or by rotating the X-ray source together with the X-ray optics. Since diffraction beams can only be expected at incidence angles where the Bragg condition is fulfilled (i.e., at angles where coherent scattering from the crystal lattice of the sample is expected), it is obvious that the area of the detector must cover a range of diffracted beam angles and also most likely be moved during X-ray detection upon variation of the incidence angle.

In order to perform the above-described X-ray diffraction, X-ray diffraction systems or X-ray diffractometers are available which comprise the following components: an X-ray source for generating a monochromatic X-ray beam (e.g., a Cu Kα-beam), an X-ray optics (e.g., a Goebel or Montel optics) which is optically coupled with the X-ray source and configured to collimate and focus the generated X-ray beam onto the sample to be investigated; a sample stage and a goniometer which are configured to hold, position and orient the sample relative to the incident beam; and a detector (e.g., a photographic plate or a semiconductor-based X-ray detector), which is configured to detect the diffracted beams. The X-ray detector is usually moved around the sample in order to capture and measure the intensity of the diffracted beams over a wide solid angle range.

In order to shorten the measurement time, it is desirable that the X-ray detector covers a wide solid angle range so that diffracted beams of different angles can be captured in a single image. In order to cover a large solid angle range the detector must be designed as large area detector and the distance between the sample to be investigated and the detector should be small. However, although two-dimensional area detectors of different sizes are nowadays available (based on CCD/CMOS technology or by using an imaging plate), the solid angle range covered by such detectors is nonetheless limited by the available CCD/CMOS sensor size and strongly dependent on the distance between detector and sample. That is, the solid angle range covered by the detector can be increased by positioning the detector close to the sample. However, for certain X-ray diffraction applications, such as X-ray diffraction experiments on crystalline macromolecule samples, the distance between detector and sample should not be too small in order to improve the resolution of closely spaced diffracted beams.

In order to cover a large solid angle range without having to position the detector too close to the sample, curved image plate detectors have been proposed. Such a curved image plate detector is known from U.S. Pat. No. 6,418,190 B1, which is designed to cover a 2θ goniometry range of −60° to +144° and which is read out by a special laser-based reader. The almost cylindrically designed imaging plate surrounds the sample to be investigated. In other words, the sample is arranged within the cylindrically shaped imaging plate and the radial distance between sample and imaging plate surface is fixed.

Since the use of imaging plates has still disadvantages compared to modern CCD/CMOS detectors in terms of sensitivity and detection speed, detector systems have been proposed which consist of a plurality of two-dimensional semiconductor-based detectors. The detectors are fixedly arranged along a curve around the sample to be investigated. Such a detector system is known from EP 1 229 351 A1, where a plurality of flat semiconductor-based detectors are arranged polygonally around a measuring area. The detector modules are fixedly connected with each other.

SUMMARY

An X-ray detector which covers in a flexible manner a large solid angle range and which is flexibly usable for different X-ray analysis needs is described. Additionally, a method for controlling such an X-ray detector so that faster X-ray diffraction measurements can be performed by simultaneously improving the measurement performance (e.g., measurement resolution and/or signal-to-noise ratio of the detected signals) is also described.

An X-ray analysis system for measuring X-ray beams diffracted by a sample to be investigated includes at least two X-ray detector modules which are articulately connected to one another; a drive mechanism configured to position the at least two articulately connected X-ray modules around the sample; and a control unit configured to control the drive mechanism to move the at least two detector modules relative to one another such that the at least two detector modules are arranged around the sample along a pre-calculated curved line having a curvature that depends on a selected distance between the detector modules and the sample.

The at least two articulately connected detector modules may be moved by the drive mechanism such that they are arranged along the pre-calculated curved line. The curved line may be pre-calculated (or in short calculated) by the control unit or another logical unit. The curved line may be calculated such that its curvature may increase with decreasing (radial) distance between the detector and the sample. In a similar way, the curved line may be calculated such that its curvature may decrease with increasing (radial) distance between the detector and the sample.

According to one variant the curvature of the curved line, along which the at least two detector modules are arranged, may be calculated in dependence of the (radial) distance between the detector and the sample such that the sample lies in the center of the curved line. That is, the calculated curved lines may be circle lines surrounding the sample to be investigated such that the sample lies in the circle center. In such a configuration, each detector module of the detector has the same perpendicular distance to the sample which corresponds to the radius of the calculated circle. The perpendicular distance may mean that the center of the detector module stands perpendicular to the circle radius.

The drive mechanism may be configured to move the at least two articulately connected detector modules such that they form along the calculated curvature around the sample a joint X-ray detector (i.e. joint X-ray detection sensor) with a joint detector surface (that is, a substantially continuous detector surface with or without gaps between neighboring detector modules) having a surface curvature in circumferential direction which substantially follows to the curvature of the calculated curved line. As each detector module may be designed as a planar two-dimensional detector, the joint detector surface may have a polygonal shape in a circumferential direction that approximates the pre-calculated circle line. This approximation may be coarser or finer depending on whether the dimensions of the individual planar detectors are large or small.

The drive mechanism may comprise a pivoting mechanism, and the moving of the at least two detector modules may comprise pivoting the detector modules relative to one another about at least one pivoting axis. The pivoting mechanism may be designed such that neighboring detector modules of the at least two detector modules can pivot about their own pivoting axis positioned between the neighboring detector modules and at their front ends facing to the sample to be investigated. Such a pivoting mechanism enables an arrangement of the at least two detector modules along curved lines of different curvatures such that possible distances (gaps) between neighboring detector modules at their front ends remain almost invariant regardless of the curvature of the curved line to be followed. Thus, with the described pivoting mechanism it is possible to realize the above described joint detector surface following the curvature of the calculated curved line.

The drive mechanism may further comprise a rotating mechanism configured to jointly rotate the at least two detector modules around the sample. By jointly rotating the at least two detector modules around the sample different $2\theta$ angle ranges of diffracted beams can be covered during X-ray diffraction measurements. Further, the drive mechanism may comprise a moving mechanism configured to jointly move the at least two detector modules in the radial direction in order to adjust the radial distance between the sample and the detector modules.

According to one variant, the X-ray detector may comprise at least three detector modules with a centered detector module and at least two laterally arranged detector modules. The laterally arranged detector modules may be articulately connected to the centered detector module at opposite sides thereof. In this configuration the at least two laterally arranged detector modules may be each individually pivotable with respect to the centered detector module. The at least two laterally arranged detector modules are individually pivotable with respect to the centered detector module to form together with the centered detector module the above described joint detector surface (joint X-ray sensor surface) around the sample following the curvature of the calculated curved line.

According to a further variant the at least two laterally arranged detector modules are individually pivotable such that the laterally arranged detector module on one side of the centered detector module may form together with the centered detector module a first partial detector surface (first X-ray sensor surface) following a curvature of a calculated first curved line. The laterally arranged detector module on the other side of the centered detector may be pivoted such that it may form together with the centered detector module a second partial detector surface (second X-ray sensor surface) following a curvature of a second calculated curved line. Hence, the laterally arranged detector modules on both opposite sides are asymmetrically pivotable with respect to the centered detector module and may follow two different curved lines.

Each of the at least two detector modules may be designed as an independent X-ray detector. Independent may mean that each X-ray detector module has its own X-ray detection sensor and readout electronics. The X-ray detection sensor may be designed as a planar two-dimensional X-ray detection sensor. As planar two-dimensional X-ray detection sensor a semiconductor-based X-ray detection sensor may be used. The planar X-ray detection sensors of the at least two detector modules may be dimensioned such that they cover a large solid angle range. According to one variant the at least two detector modules are designed to cover a $2\theta$ range of at least 134 degrees.

The X-ray detector may further comprise a casing for receiving the at least two detector modules. In addition, the X-ray detector may comprise a curved X-ray transparent window arranged at the front side (that is the side facing to the sample) of the at least two detector modules. The X-ray transparent window may be positioned on a fixed curve. Alternatively, the X-ray transparent window may be movable corresponding to the calculated curve of the detector modules. That is, the X-ray transparent window may be designed flexible so that the curvature of the curved window can be adjusted to the curved position of the detector modules.

According to another aspect an X-ray analysis system, in particular, an X-ray diffraction system is provided for performing X-ray diffraction on samples. The X-ray analysis system comprises an X-ray optical device configured to generate and image a beam of X-rays to a sample to be investigated; a sample stage configured to hold and orient the sample relative to the incident X-ray beam; and the X-ray detector as described above for measuring the diffracted X-ray beams.

The X-ray optical device may comprise an X-ray source and an X-ray optics. The X-ray source is configured to generate X-ray radiation of a characteristic wavelength. The X-ray optics is coupled to the X-ray source and configured to collimate and direct the generated X-ray beam onto a sample. For this purpose, the X-ray optics may be designed as X-ray focusing optics comprising at least one reflective element, such as a multi-layer mirror with (laterally or depth) graded d-facing.

The X-ray analysis system may further comprise a control unit. The control unit may be an electronic control unit configured to control the drive mechanism of the X-ray detector to move the detector modules such that they are arranged along a pre-calculated curved line. The control unit may also be designed to calculate the curved line in dependence of the radial distance of the detector from the sample.

Further, the control unit may be configured to control the radial and circumferential movement of the detector. Additionally, the control unit may be designed to control the movement of the X-ray optics and the sample stage. In order to carry out the above-mentioned functionalities, the control unit may be designed as a centralized unit or as distributed unit comprising distributed control (sub)modules for carrying out specific functionalities. Independent of the implementation as centralized or distributed control unit, the control unit comprises one or more logic units for calculating and coordinating the movement of the system components.

According to another aspect, a method of controlling operation of an X-ray detector used in an X-ray analysis system for measuring diffracted X-ray beams is provided, wherein the X-ray detector comprises at least two X-ray detector modules which are articulately connected to one another and a drive mechanism configured for moving the at least two detector modules relative to one another, the method comprising the following steps: adjusting a distance between a sample to be investigated and the X-ray detector; and moving the at least two detector modules relative to one another such that the at least two detector modules are arranged around the sample along a pre-calculated curved line having a curvature that depends on the adjusted distance between the detector and the sample.

The method may further comprise: calculating the curved line in dependence of the adjusted detector distance to the sample, wherein the curvature of the calculated line is adjusted in dependence of the radial distance of the detector to the sample; and controlling the drive mechanism to move the at least two detector modules to follow the curved line. The calculated curved line may be a circle line surrounding the sample to be investigated such that the sample lies in the center of the circle.

The step of adjusting a distance between the sample and the detector may be performed by the drive mechanism or a separate moving mechanism and may comprise: jointly moving the detector modules in the radial direction such that the detector has a desired radial distance from the sample to be investigated.

The method may further comprise the following steps which precede the adjusting step: determining a desired distance on the basis of a received input signal. The received input signal may be a user input signal indicative of the desired distance of the detector from the sample.

According to still another example, a computer program product is provided. The computer program product comprises program code portions for carrying out the above-described method (method steps) when the computer program product is executed on a computer device. The computer program product may be stored in a (non-transitory) computer-readable recording medium.

Further objects, features, and advantages of this invention will become readily apparent to persons skilled in the art after a review of the following description, with reference to the drawings and claims that are appended to and form a part of this specification.

DETAILED DESCRIPTION

In the following description, for the purposes of explanation and not limitation, specific details are set forth in order to provide for a thorough understanding of the X-ray detector and X-ray analysis system presented herein. It will be apparent for one skilled in the art that the disclosed X-ray analysis system and X-ray detector may deviate within the scope of protection from specific details set forth hereinafter.

Figure 1:
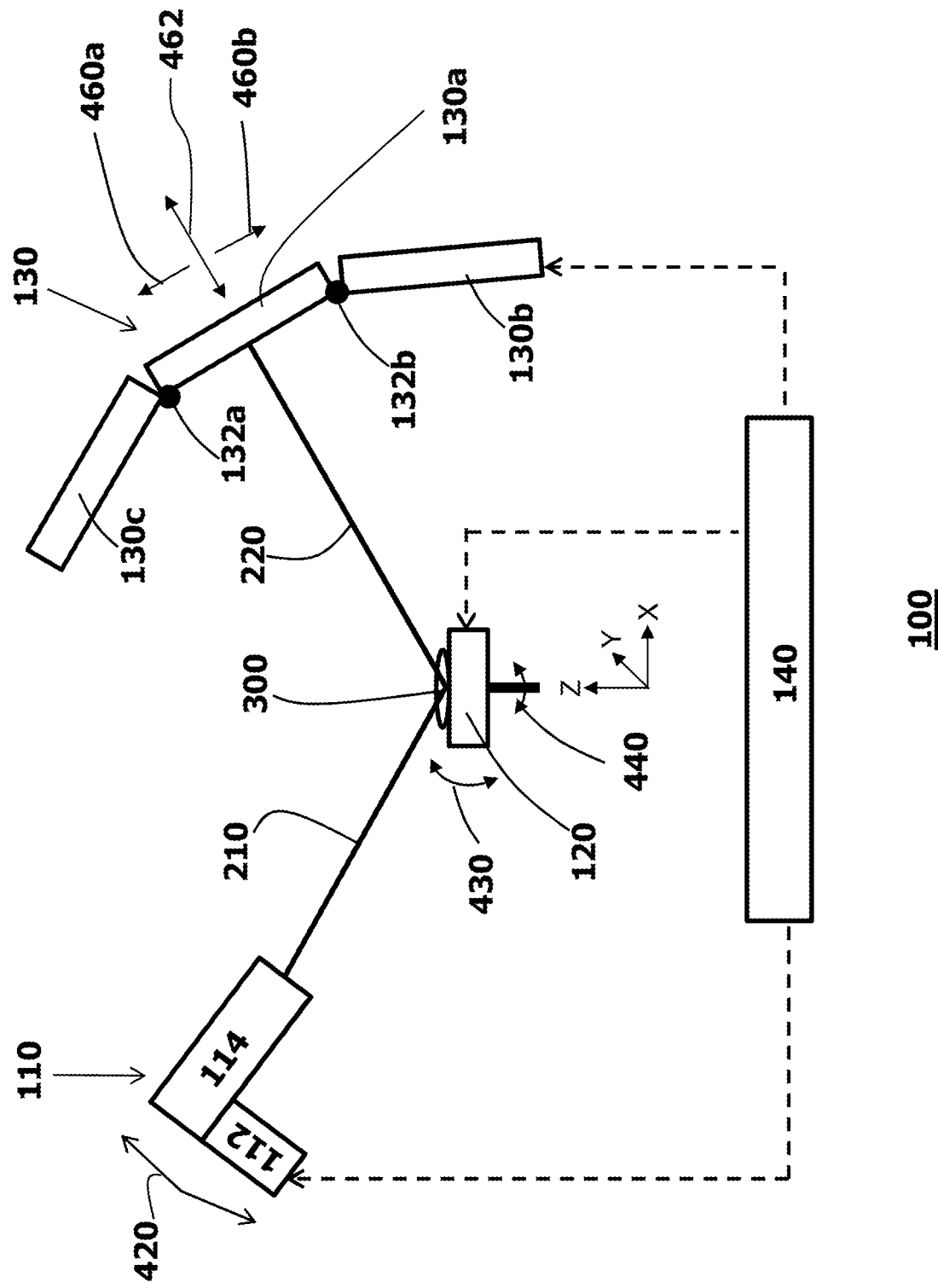
FIG. 1 is a schematic drawing of an X-ray analysis system comprising an X-ray detector.

FIG. 1 illustrates a schematic representation of an X-ray analysis system 100. The X-ray analysis system 100 is an X-ray diffractometer designed for carrying out X-ray diffraction analysis on crystalline, polycrystalline or powder samples 300. The X-ray analysis system 100 comprises an X-ray optical device 110, a sample stage 120 and an X-ray detector 130. The X-ray optical device 110, in turn, comprises an X-ray source 112 and an X-ray optics 114 coupled with the X-ray source 112. Further, the X-ray analysis system 100 comprises at least one control unit 140 designed for controlling operation of at least one of the X-ray detector 130, sample stage 120 and X-ray optical device 110.

The X-ray source 112 of the X-ray optical device 110 is configured to generate X-ray radiation. For this purpose, a conventional X-ray generator may be employed, which is configured to generate X-rays by bombarding a static or rotating metal target or a liquid-metal target (such as the liquid-metal jet X-ray source of Excillum) with high-velocity electrons accelerated by strong electric fields. As metal target, a chromium (Cr), cobalt (Co), copper (Cu), molybdenum (Mo), silver (Ag) or iron (Fe) target may be used.

The X-ray optics 114 is arranged between the X-ray source 112 and the sample stage 120. The X-ray optics 114 is optically coupled with the X-ray source 112. The optics 114 is configured to generate a collimated monochromatic X-ray beam 210 of predetermined shape from the X-rays of the X-ray source 112 and to image the beam 210 to a specific region where the sample 300 can be placed. For this purpose, the X-ray optics 114 may be designed as X-ray focusing optics comprising at least one reflective element, such as a multi-layer mirror with (laterally or depth) graded d-facing.

The sample stage 120 is configured to hold the sample 300 in predetermined orientations relative to the X-ray beam 210 output by the X-ray optics 114. In order to orient the sample 300 with respect to the incident X-ray beam 210, the stage 120 may be rotatable in plane (arrow 440 in FIG. 1) and out of plane (arrow 430 in FIG. 1). Moreover, in order to position the sample 300 with respect to the incident beam region, the stage 120 may be designed to perform a translational movement in x, y, and z-direction (see the coordinate system in FIG. 1). It is clear that the movement in x, y and z-direction as well as (in plane and out of plane) rotation can be implemented by corresponding drive units coupled with the stage 120 (please note the drive units are omitted in FIG. 1 for the sake of clarity and only the possible movements of the stage 120 are indicated by arrows 430, 440).

The X-ray detector 130 is configured to measure intensity, spatial distribution, spectrum and/or other properties of the X-rays scattered by the sample 300. The X-ray detector 130 comprises at least two detector modules which are articulately connected with each other. In the implementation illustrated in FIG. 1 the X-ray detector 130 comprises three separate detector modules 130a, 130b, and 130c which are articulately connected to each other (see articulate connections 132a, 132b in FIG. 1). That is, the separate detector modules 130a, 130b, and 130c together form the X-ray detector 130 having a curved joint detector surface. Each detector module 130a, 130b, 130c comprises a flat, two-dimensional semiconductor-based X-ray detection sensor so that each detector module 130a, 130b, 130c can detect X-ray beams independently. The articulately connected detector modules 130a, 130b, 130c form together a large curved sensor area capable of detecting diffracted X-ray beams over a large solid angle range.

The dimensions of the X-ray detection sensor of each detector module 130a, 130b, 130c may be predetermined. It is clear that in order to cover a large solid angle range, two-dimensional detectors having a large planar X-ray detection sensor are preferred. Alternatively, a large solid angle range can also be covered by using detector modules 130a, 130b, 130c with smaller planar sensors. In such a case, more than two or three detector modules (in FIG. 1 only three detector modules 130a, 130b, 130c are illustrated for the purpose of explanation but not of limitation) can be articulately connected with each other in order to cover a larger solid angle range. Implementations of the X-ray detector 130 and the detector modules 130a, 130b, 130c will be explained in more detail in conjunction with the subsequent figures.

Figure 2:
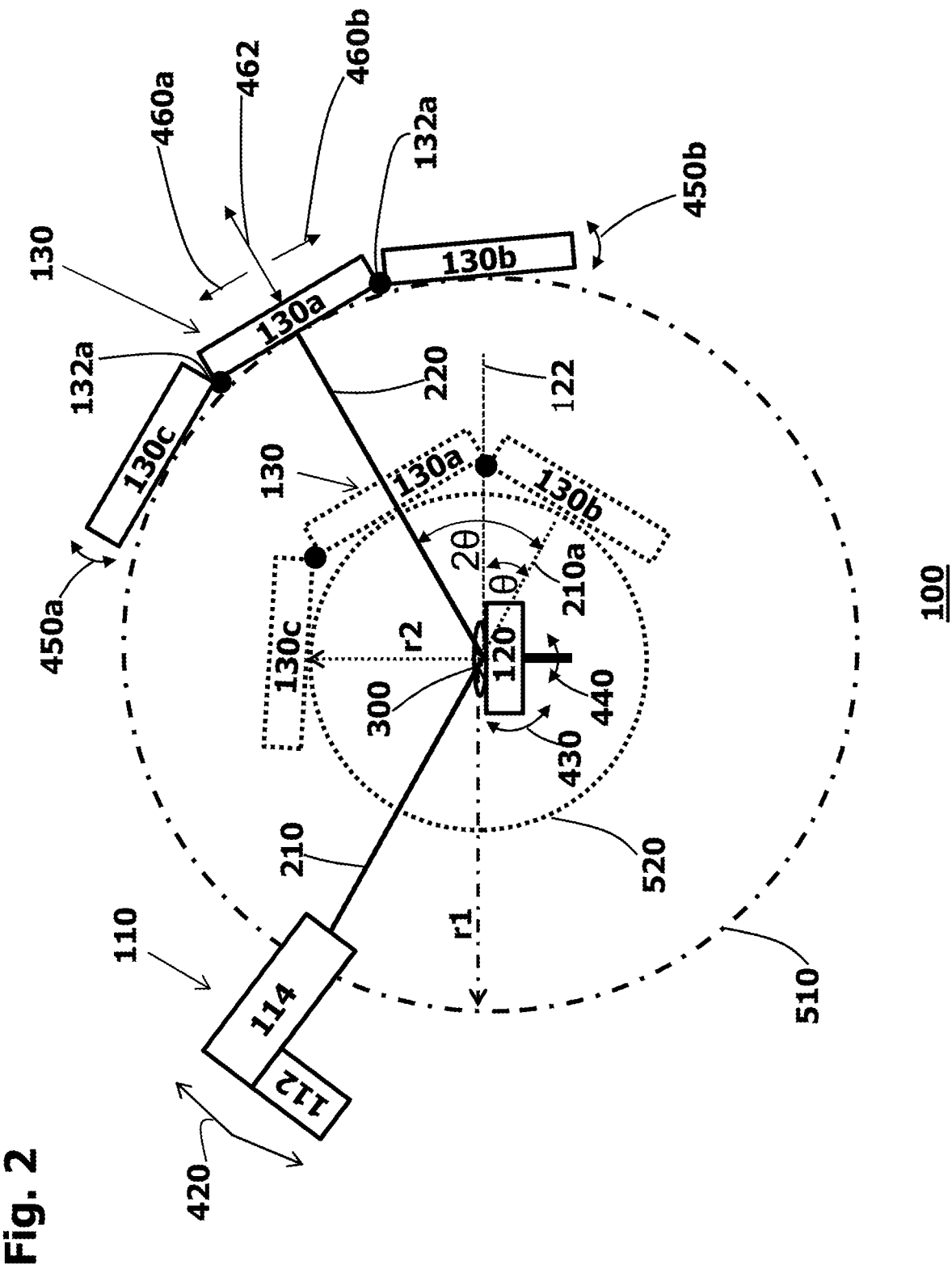
FIG. 2 is a schematic drawing illustrating an operation of the X-ray analysis system and X-ray detector of FIG. 1.

In the following, one operation of the X-ray analysis system 100 of FIG. 1 will be described in more detail in conjunction with FIG. 2. In FIG. 2 the control unit 140 of the X-ray analysis system 100 has been omitted for the sake of clarity.

In operation, the X-ray source 112 generates and emits X-rays towards the reflective optics 114. The reflective optics 114, in turn, reflects X-rays of a selected wavelength (for instance, Cu Kα X-rays) in the form of an X-ray beam of predetermined cross-sectional area and cross-sectional shape towards the crystalline or powder sample 300 to be investigated. It is clear that shape and cross-sectional area of the X-ray beam may depend on the X-ray optics design and may vary between different design implementations.

The sample 300 is mounted on the sample stage 120 and moved into the beam area so that the incident beam 210 can be diffracted by the sample 300. In order to detect the structure of the sample 300, measurements at different incidence angles θ of the X-ray beam 210 are performed. The incidence angle θ can be varied by either rotating the sample 300 with respect to the incident beam 210 (ω rotation illustrated by arrow 430 for performing a θ-2θ scan), or by keeping the sample fixed and rotating the X-ray optical device 110 around the sample 300 (rotation is indicated by arrow 420 in FIG. 2). By varying the incidence angle θ diffracted beam spots can only be obtained at corresponding 2θ positions, where the Bragg condition is fulfilled. Hence, in order to measure the diffracted beams 220, the X-ray detector 130 has to be positioned at a corresponding angle 2θ for each incident angle θ. That is, in case that the X-ray detector 130 does not already cover the desired 2θ position, the X-ray detector 130 as a whole (i.e., all the detector modules 130a, 130b, 130c) has to be (jointly) moved in circumferential direction around the sample 300 such that the X-ray detector 130 (i.e., one of the detector modules 130a, 130b, 130c) covers the desired angular position. This angular movement, if required, is performed by a rotating mechanism (not shown in FIG. 2) and is indicated by the arrows 460a, 460b in FIG. 2. Further, the angle θ is the angle between the incident beam 210 and the planar surface 122 of the sample stage 120 and the angle 2θ is the angle between the diffracted beam 220 and the incident beam 210 going through the sample 300 (see FIG. 2).

Depending on the experimental needs it is often desired to adjust the radial distance between the X-ray detector 130 and the sample 300 to be investigated. For example, samples of large molecules create very closely spaced diffracted beams and, in such a case, the distance of the X-ray detector 130 to the sample 300 should be increased to improve the resolution of the closely spaced diffracted beam spot. In order to adjust the detector distance from the sample 300, a moving mechanism may be provided which is configured to change the radial position of the X-ray detector 130 relative to the sample 300 (or sample stage 120). This radial movement with respect to the sample 300 is indicated by arrow 462 in FIG. 2.

Not only is the X-ray detector 130 as a whole movable in radial direction (i.e., radially back and forth relative to the sample 300), but also the articulately connected detector modules 130a, 130b, 130c are movable (pivotable) with respect to one another such that they form a curved joint detector surface having a curvature which depends on the radial distance to the sample 300. That is, the detector modules 130a, 130b, 130c are pivoted by a pivoting mechanism (in FIG. 2 the pivoting is indicated by arrows 450a, 450b) such that the X-ray detector 130 as a whole (i.e., all detector modules 130a, 130b, 130) is arranged along a pre-calculated imaginary curved line 510, 520 (in FIG. 2 shown as dotted line 520 and dashed/dotted line 510 for two different detector distances r1 and r2). The pre-calculated curved line 510, 520 is an imaginary circle line surrounding the sample 300 such that the sample 300 lies in the circle center and the detector distance from the sample 300 corresponds to the circle radius r1, r2. Thus, since the curvature of the circle line correlates with the radial distance to its circle center according to the relation $K=1/r$, it is clear that the degree of movement (or degree of pivoting) of the detector modules 130a, 130b, 130c relative to one another depends on the detector distance to the sample 300.

The above mentioned varying degree of pivoting of the detector modules 130a, 130b, 130c in dependence of the detector distance to the sample 300 is further schematically illustrated in FIG. 2, where two operating modes of the X-ray detector 130 are shown. In a first mode, the X-ray detector 130 has a relatively large distance r1 from the sample 300, and the articulated detector modules 130a, 130b, 130c which have to follow the curvature of a pre-calculated circle line 510 with radius r1 are moderately pivoted relative to one another. In a second mode, the same X-ray detector 130 has a relatively small distance r2 from the sample 300, and the corresponding articulated detector modules 130a, 130b, 130c which have to follow the curvature of a pre-calculated circle line 520 with radius r2 are more strongly pivoted relative to one another. In order to sufficiently distinguish both detector operating modes the detector 130 in the second operating mode is illustrated in dotted lines.

Since the detector modules 130a, 130b, 130c are moved to follow the pre-calculated circle lines 510, 520, they all have the same radial (perpendicular) distance to the sample 300. In this context, perpendicular distance means that the center of each detector module 130a, 130b, 130c stands perpendicular to the circle radius. Thus, independent of whether the detector modules 130a, 130b, 130c are arranged along a circular line of strong or small curvature, all detector modules 130a, 130b, 130c generally have the same radial distance to the sample 300. This facilitates evaluation of the X-ray measurements originating from different detector modules 130a, 130b, 130c because they are comparable in terms of resolution, signal-to-noise-ratio, and other detection parameters influencing the data acquisition evaluation. In particular, the same distance of all detection modules 120a, 130b, 130c to the sample 300 facilitates the processing of the measured data and merging of the processed data to a single diffraction pattern over a wide 2θ angular range.

Figure 3:
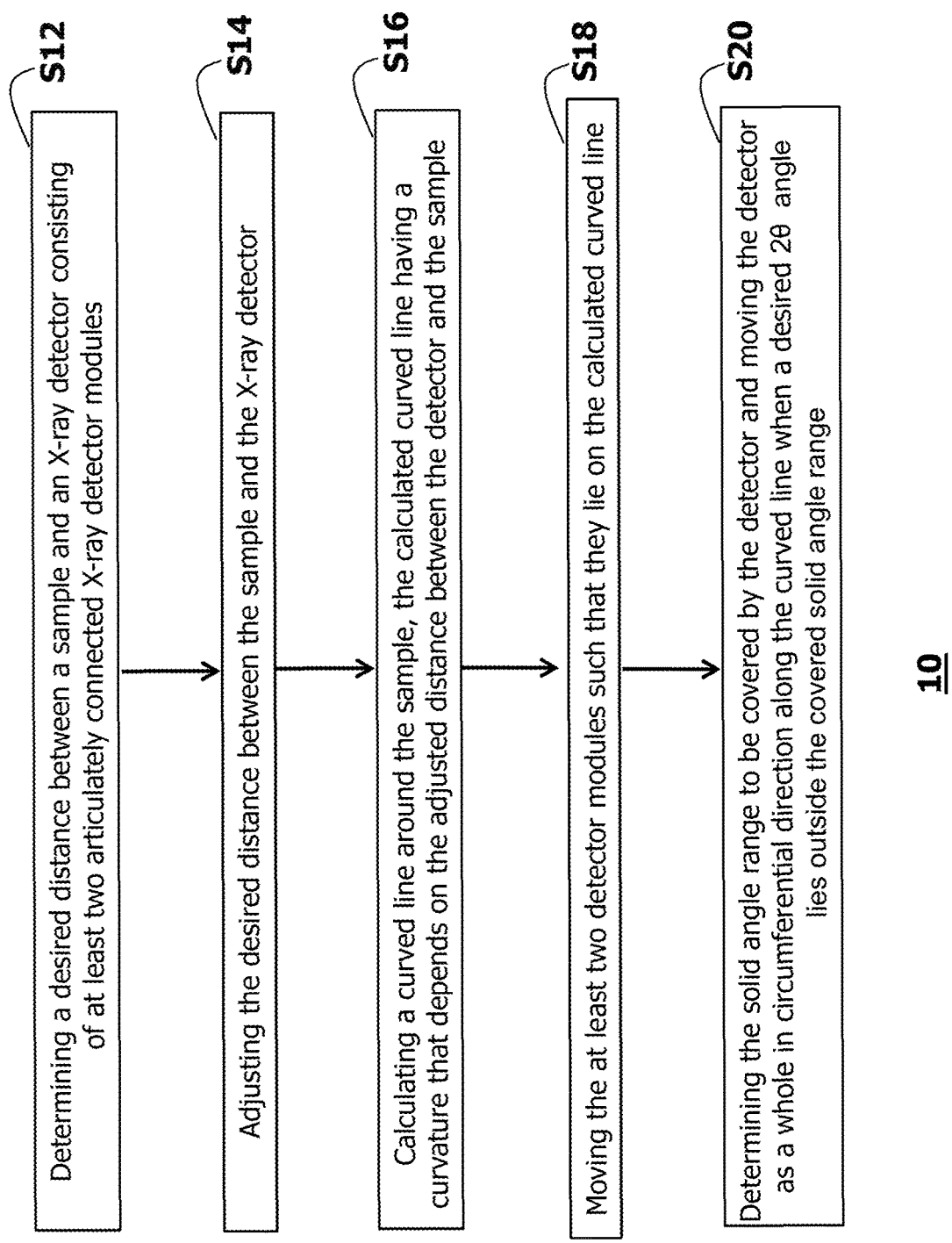
FIG. 3 is a flow diagram illustrating a method of controlling operation of the X-ray detector of the X-ray analysis system according to FIG. 1.

In the following the operation of the X-ray detector 130 during X-ray diffraction measurements will be further described. FIG. 3 shows a flow diagram illustrating a method 10 of controlling the X-ray detector 130 during operation.

In a first step S12, a desired distance between the sample 300 and the X-ray detector 130 which consists of at least two articulately connected detector modules (in the implementation of FIG. 2 the X-ray detector 130 has three detector modules 130a, 130b, 130c) is determined. With desired distance, a distance is meant which is preferably set for measuring a specific sample. The desirable distance can vary from sample to sample to be measured. The desired distance can be determined from an input signal received from a user and indicative of the desired detector distance. In addition, a position sensor signal may be read out which measures the current position of the X-ray detector 130.

Thereafter, in a second step S14, the new detector distance is adjusted based on the desired distance (and the current position of the X-ray detector 130). This is done by moving the X-ray detector 130 as a whole (that is, all detector modules 130a, 130b, 130c in common) in a radial direction relative to the sample 300. In case the current position of the X-ray detector 130 is positioned too close to the sample, the X-ray detector 130 is moved radially outwardly until the desired distance is obtained. In case the X-ray detector 130 is too far away from the sample 300 the X-ray detector 130 as a whole is moved radially inwardly until the desired distance is obtained.

In a further step S16, a curved line 510, 520 (see FIG. 2) is calculated, wherein the curved line 510, 520 has a curvature that depends on the adjusted distance between the sample 300 and the X-ray detector 130. The calculated curved line 510, 520 is an imaginary trajectory along which the detector modules 130a, 130b, 130c (more precisely the X-ray detection sensors of the X-ray detector modules 130a, 130b, 130c) are arranged. The curved line 510, 520 also represents the trajectory along which the arranged detector modules 130a, 130b, 130c are moved during X-ray measurement (e.g., when performing a θ-2θ-scan). This trajectory is a circle with a circle center coinciding with the sample position and a circle radius corresponding to the detector distance from the sample 300.

Thereafter, in step S18, the detector modules 130a, 130b, 130c are moved with respect to each other such that they are arranged along the curved line 510, 520. That is, the detector modules 130a, 130b, 130c are pivoted with respect to each other such that they follow the curvature of the circle line 510, 520.

In an optional further step S20 the solid angle range is determined, which the X-ray detector 130 is covering after arranging the detector modules 130a, 130b, 130c along the calculated circle line. Moreover, if it is determined that a 2θ measuring angle lies outside the covered solid angle range, the X-ray detector 130 as a whole is moved in a circumferential direction along the circle line 510, 520 until at least one of the detector modules 130a, 130b, 130c comes into the desired 2θ angular position.

The above-described method may be performed by a centralized control unit 140 of the X-ray analysis system 100 (e.g., by the control unit 140 in FIG. 1) or by a separate control unit or control sub-module associated with the X-ray detector 130. For this purpose, the control unit or control sub-module comprises a processing unit (programmed microprocessor, Application Specific Integrated Circuit (ASIC)) for executing program code portions (program instructions) implementing the above-described method. The control unit or control sub-module may further comprise at least one memory configured to buffer or store the program code portions.

Figure 4A:
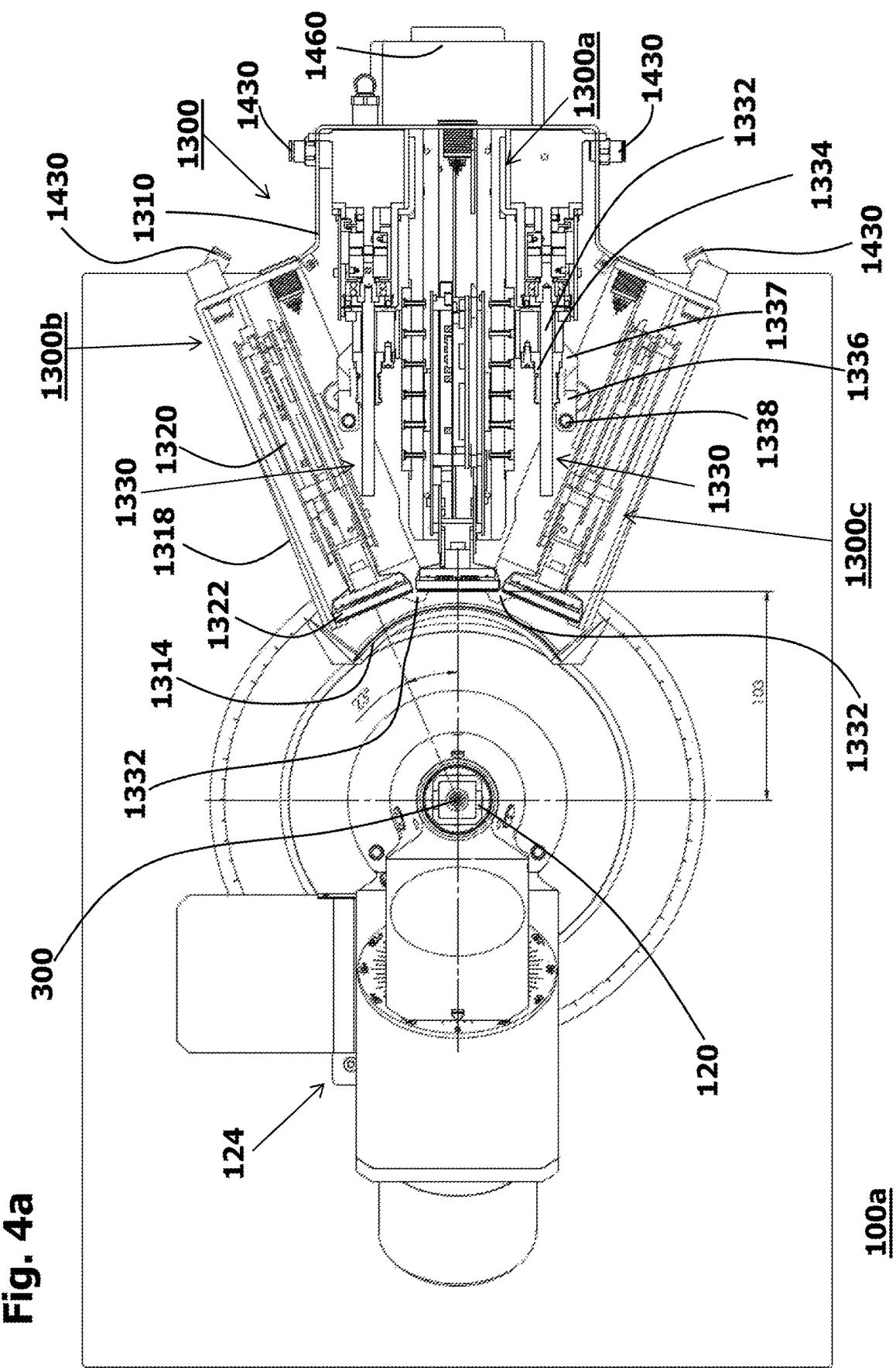
FIG. 4A is a plan view of an X-ray analysis system comprising an X-ray detector, wherein the X-ray detector is in a first operating mode.

In conjunction with FIG. 4a, one implementation of an X-ray detector is further described. FIG. 4a illustrates in the form of a plan view an X-ray analysis system 100a which comprises a (kappa geometry) goniometer 124, a sample stage 120, and an X-ray detector 1300. The X-ray analysis system 100a also comprises an X-ray optical device which is not shown in FIG. 4a for clarity. The X-ray optical device may be designed in the same way as the X-ray optical device 110 described above in conjunction with FIGS. 1 and 2. Further, the sample stage 120 may correspond to the sample stage 120 of FIGS. 1 and 2 and work in the same way as described above in conjunction with FIGS. 1 and 2.

In the following, the X-ray detector 1300 is further described. The X-ray detector 1300 comprises three separate X-ray detector modules 1300a, 1300b, 1300c, which are received by a casing 1310. The casing 1310 is closed at its front side by an X-ray transparent curved window 1314 (see FIG. 4a). It is noted that each detector module 1300a, 1300b, 1300c is designed as a separate X-ray detector module capable of detecting diffracted X-ray beams 220. Each detector module 1300a, 1300b, 1300c comprises a planar two-dimensional semiconductor-based X-ray detection sensor 1322 (for instance, a two-dimensional CCD or CMOS sensor), a readout electronics 1320 and a housing 1318 for receiving the X-ray detector 1322 and the readout electronics 1320. Moreover, each detector module 1300a, 1300b, 1300c is provided with its own electrical connections 1410 for power supply and signal communications. Further, each detector module 1300a, 1300b, 1300c is provided with a cooling circuit configured to receive and circulate a cooling fluid (such as water) or cooling gas for cooling the readout electronics 1320 and/or the X-ray detection sensor 1322. Each cooling circuit may comprise at least one inlet port and outlet port 1430 through which cooling fluid or cooling gas can flow in and out of the cooling circuit. Further, each detector module 1300a, 1300b, 1300c may be provided with vacuum/gas ports (not illustrated in FIG. 4a) for providing protective gas/vacuum for the X-ray detection sensors 1322 or the spaces surrounding the X-ray detection sensors 1322. Although the detector modules 1300a, 1300b, 1300c are identically designed, only the components of detector 1300*b* in FIG. 4 have been provided with reference numerals for the sake of clarity. The advantage of providing three separate and independently operating X-ray detector modules 1300*a*, 1300*b*, 1300*c* is that in case of failure of one detector module the remaining detector modules are still operable and the X-ray detector 1300 can be used. Additionally, the described design facilitates a quick and easy repair since only the defective module has to be replaced and this replacement can be done without having to disassemble the remaining operating detector modules.

As further illustrated in FIG. 4*a*, the detector modules 1300*a*, 1300*b*, 1300*c* are articulately connected to each other. In order to realize such an articulated connection a pivoting mechanism between each of the two laterally arranged detector modules 1300*b*, 1300*c* and the centrally arranged (or centered) detector module 1300*a* is provided. The pivoting mechanism is provided on both lateral sides of the centered detector module 1300*a* such that the laterally arranged detector modules 1300*b*, 1300*c* can be pivoted with respect to the centered detector module 1300*a*. Further, the centered detector module 1300*a* is movably mounted on a rail 1460 and can be moved (by a linear drive unit which is not shown in FIG. 2) along the rail 1460 back and forth with respect to the sample 300 or sample stage 120. The rail 1460, in turn, may be pivotable around the sample stage 120 so that a rotation of the rail 1460 about the sample stage 120 also causes the centered detector module 1300*a* to rotate about the sample stage 120. The described axial movement on the rail 1460 and rotational movement around the sample stage 120 is also performed by the laterally arranged detector modules 1300*b*, 1300*c*, as they are connected to the centered detector module 1300*a*.

Figure 4B:
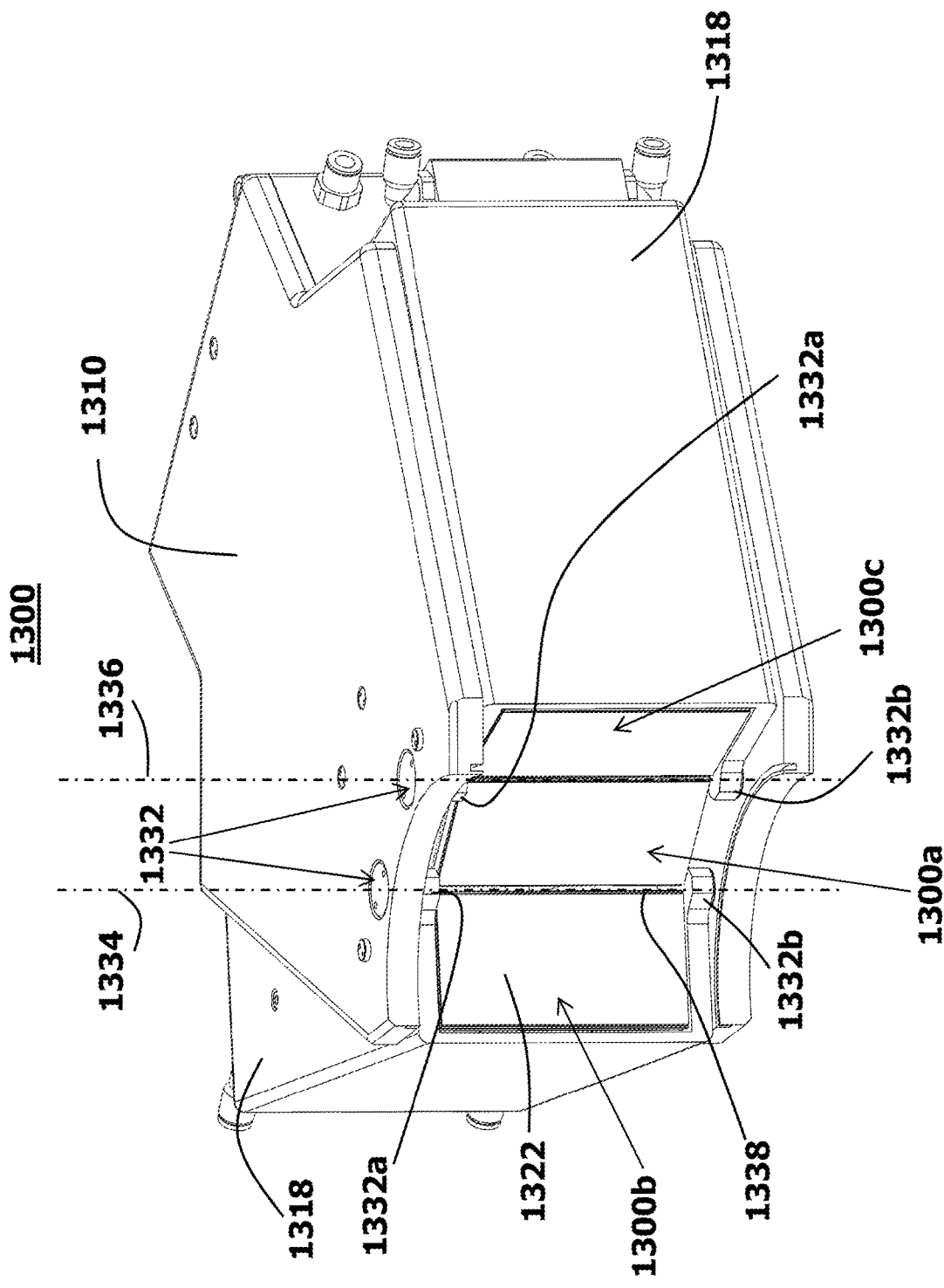
FIG. 4B is a three-dimensional front view of the X-ray detector of FIG. 4A without X-ray transparent window.

With reference to FIG. 4*a* and FIG. 4*b*, the pivoting mechanism will be further described. Each of the two pivoting mechanisms comprises a pivot bearing 1332 and a pivoting drive 1330. The pivot bearing 1332 is only visible in FIG. 4*b* illustrating a three-dimensional front view of the X-ray detector 1300 with removed transparent window 1314. As derivable from FIG. 4*b*, the pivot bearing 1332 comprises an upper pivot bearing part 1332*a* and a lower pivot bearing part 1332*b* which are situated at the transition of the lateral detector module 1300*b*, 1300*c* to the centered detector module 1300*a*. Hence, corresponding upper and lower pivot bearing parts 1332*a*, 1332*b* of the two pivot bearings 1332 are forming corresponding pivot axes 1334, 1336 which are situated in the transition gaps 1338 formed between the centered detector module 1300*a* and the corresponding lateral detector modules 1300*b*, 1300*c*. The upper and lower pivot bearing parts 1332*a*, 1332*b* may each comprise a pivot pin and a mating hole for receiving the pivot pin.

According to the implementation illustrated in FIG. 4*b*, the pivot pins are arranged at the top and bottom of the corresponding detector module housings 1318, whereas the corresponding mating holes are arranged in the casing 1310. Since the upper and lower pivot bearing parts 1332*a*, 1332*b* are arranged above and below the X-ray detection sensors 1322 and do not extend into the gap 1338, the gap 1338 between adjacent X-ray detection sensors 1322 can be kept small. Or in other words, the X-ray detection sensors 1322 are arranged as close as possible in order to minimize the gap 1338 at the detector front sides.

The two pivoting drives 1330 are arranged at the opposite lateral sides of the centrally arranged detector module 1300*a*. The drives are designed to pivot the laterally arranged detector modules 1300*b*, 1300*c* with respect to the centrally arranged detector module 1300*a*. For this purpose, each pivoting drive 1330 is designed to comprise a shaft 1332 and a sleeve 1334 movably mounted on the shaft 1332. The sleeve 1334 is designed to be movable forth and back on the shaft 1332. This axial movement of the sleeve 1334 can be actuated hydraulically (for instance, by coupling the sleeve 1334 with a pressure generating fluid circuit) or electro-mechanically (for instance, by implementing the above described shaft-sleeve unit as a spindle-nut drive). Each of the two pivoting mechanisms further comprises a pivoting lever 1336 which is pivotably mounted with its first end 1337 on the sleeve 1334 and with its opposite second end 1338 on the corresponding lateral detector module 1300*b*, 1300*c*. By moving the sleeves 1334 forth and back (i.e., towards the sample stage 120 and away therefrom), the corresponding pivoting levers 1336 can be selectively pivoted so that the laterally arranged detector modules 1300*b*, 1300*c* are pivoted outwardly or inwardly.

It is noted that according to the above described pivoting mechanism only the laterally arranged detector modules 1300*b*, 1300*c* are pivotable with respect to the centered detector module 1300*a*. Moreover, the pivoting drive 1330 is designed such that each of the two laterally arranged detector modules 1300*b*, 1330*c* pivot with respect to the centered detector module 1300*a* about the corresponding pivoting axis 1334, 1336. That is, the laterally arranged detector modules 1300*b*, 1330*c* are movable like wings, and depending on the degree of pivoting, the three detector modules 1300*a*, 1300*b*, 1300*c* form a joint detector with variable curvature.

Still with reference to FIG. 4*a* an exemplary first operating mode of the X-ray detector 1300 is further described. FIG. 4*a* illustrates an operating mode, where the detector 1300 is positioned far away from the sample 300 and accordingly the curvature of the three detector modules 1300*a*, 1300*b*, 1300*c* is low. That is, in the shown operating mode the detector modules 1300*a*, 1300*b*, 1300*c* are positioned along a circle line with a radius of 103 mm. This means that each detector module 1300*a*, 1300*b*, 1300*c* (or more precisely the X-ray detection sensor 1322 on the front side of each detector module 1300*a*, 1300*b*, 1300*c*) has a perpendicular distance of 103 mm to the sample 300. Again with the perpendicular distance, the distance between the sample and the center of the detector modules 1300*a*, 1300*b*, 1300*c* is meant where the radius of the circle stands perpendicular to the detector surface.

Figure 5:
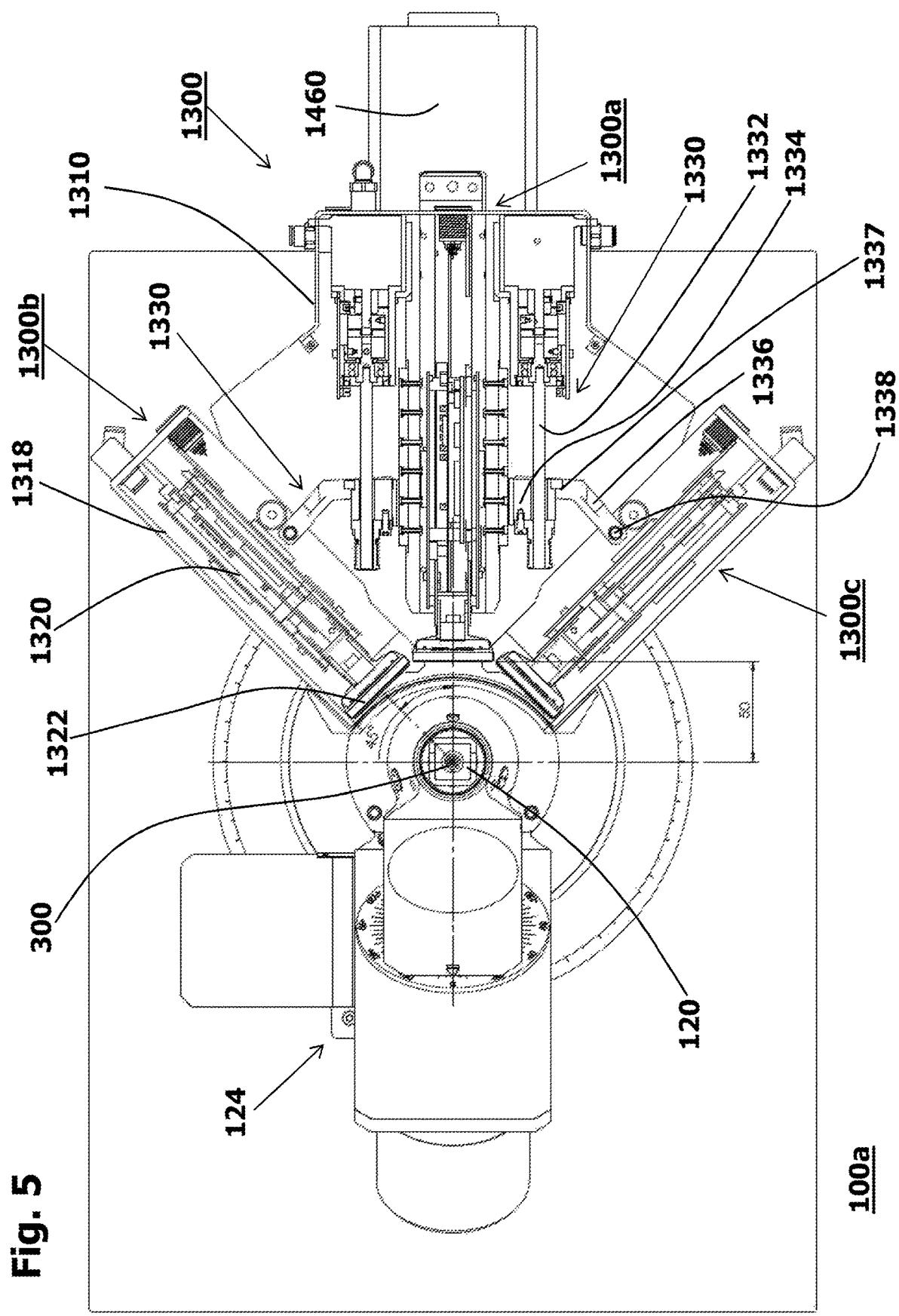
FIG. 5 illustrates the X-ray analysis system of FIG. 4A with the X-ray detector being in a second operating mode.

With reference to FIG. 5 an exemplary second operating mode of the X-ray detector 1300 is described. In this operating mode, the centered detector 1300*a* (and therefore the whole X-ray detector 1300) is axially moved on the rail 1460 so that the X-ray detector 1300 is positioned very close to the sample 300. In the illustrated example this distance amounts to be approximately 50 mm. Further, the laterally arranged detector modules 1300*b*, 1300*c* are almost fully pivoted outwardly with respect to the centered module 1300*a* in order to increase the curvature of the whole X-ray detector 1300. That is, the laterally arranged detector modules 1300*b*, 1300*c* are pivoted outwardly with respect to the centrally arranged detector module 1300*a* such that also the X-ray detection sensors 1322 of the laterally arranged detector modules 1300*b*, 1300*c* have the same perpendicular distance of 50 mm to the sample 300. Or, in other words, the laterally arranged detector modules 1300*b*, 1300*c* are pivoted outwardly such that the two-dimensional X-ray detection sensors 1322 of the detector modules 1300*a*, 1300*b*, 1300*c* lie on a circle line with the sample 300 arranged in the circle center.

In deviation of the above-described distances, other detector-sample distances can be adjusted and the laterally arranged detector modules 1300b, 1300c are pivoted such that the X-ray detection sensors 1322 of all three detector modules 1300b, 1300c have the same radial (perpendicular) distance to the sample 300.

Figure 6:
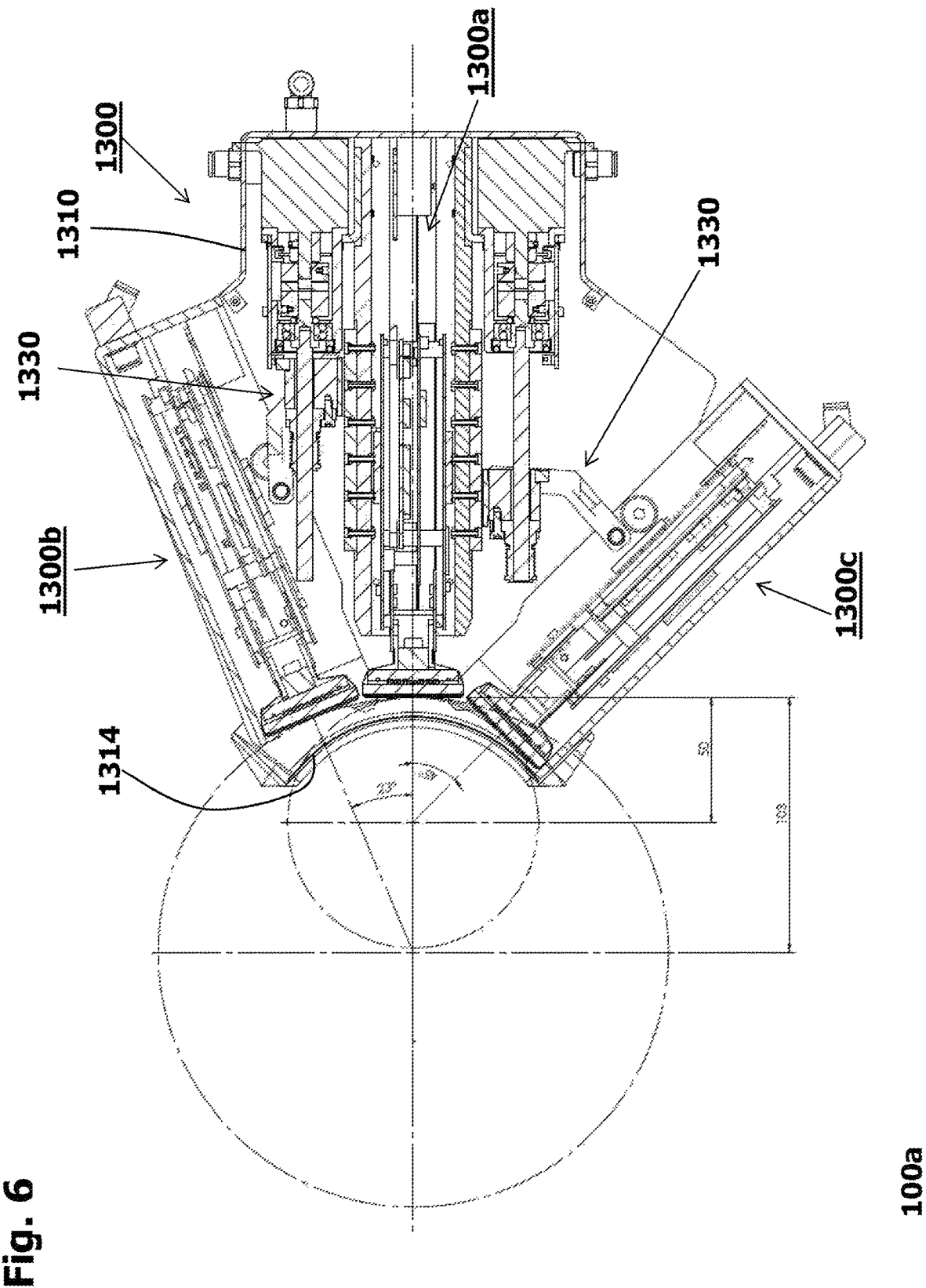
FIG. 6 illustrates the X-ray detector of the X-ray analysis system of FIG. 4A in a third operating mode.

With reference to FIG. 6 a third operating mode of the X-ray detector 1300 is described. This operating mode differs from the first and second operating modes of FIGS. 4a and 5 in that the laterally arranged detector modules 1300b, 1300c are pivoted in an asymmetric way. Since both laterally arranged X-ray detector modules 1300b, 1300c are connected by an individual pivoting mechanism to the centrally arranged detector module 1300a; both pivoting mechanisms can be operated independently. This also allows a configuration in which one laterally arranged detector module 1300c is more strongly pivoted than the opposite laterally arranged detector module 1300b. In such a case it is possible to realize a detector configuration, in which the X-ray detection sensors 1322 of the centrally arranged detector module 1300a forms together with the X-ray detection sensor 1322 of one laterally arranged detector module 1300b a circle line of a first curvature (in the exemplary illustration of FIG. 5 a circle with radius r=103 mm is formed) and together with the X-ray detection sensor 1322 of the opposite laterally arranged detector module 1300c a circle line of a second curvature (in the exemplary illustration of FIG. 5 a circle with radius r=50 mm is formed). It is clear that the invention is not limited to the above-mentioned curve radii. Depending on the experimental needs other curve radii can be realized by the above described articulately connected detector modules 1300a, 1300b, 1300c.

Figure 7:
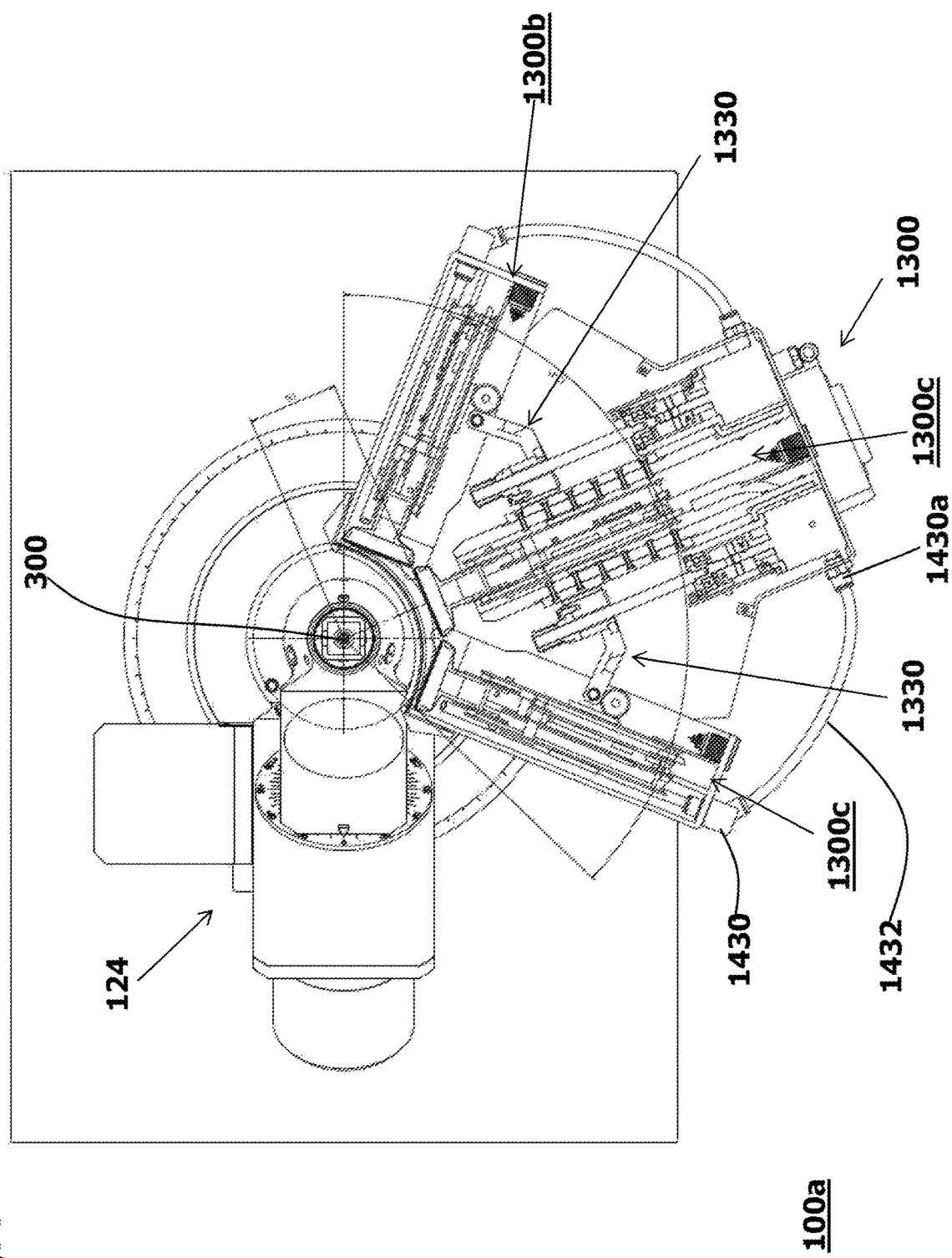
FIG. 7 shows the X-ray analysis system of FIG. 4A with the X-ray detector in a specific operating position.

With reference to FIG. 7, a further position of the X-ray detector 1300 is described. In FIG. 7, a configuration is shown where the laterally arranged detectors 1300b, 1300c are pivoted such that the X-ray detection sensors 1322 are arranged on a circle line having a radius of 50 mm. Moreover, the X-ray detector 1300 as a whole is rotated around the sample 300 such that the three separate detector modules 1300a, 1300b, 1300c (almost) seamlessly cover a 2θ angle range from 0° to 134°. A 2θ angle of 0° means that the diffracted beam is parallel to the incident beam. Further, a 2θ angle of 134° corresponds for Cu Kα x-ray wavelength to a sample d-spacing (i.e., diffraction resolution) of 0.837 Å, which is the International Union of Crystallography (IUCr) requirement for publications of crystal structures. Thus, with the described X-ray detector 1300 diffracted beams in the range from 0° to 134° can be detected without having to rotate the X-ray detector 1300, which does speed up the measurement considerably.

Figure 8:
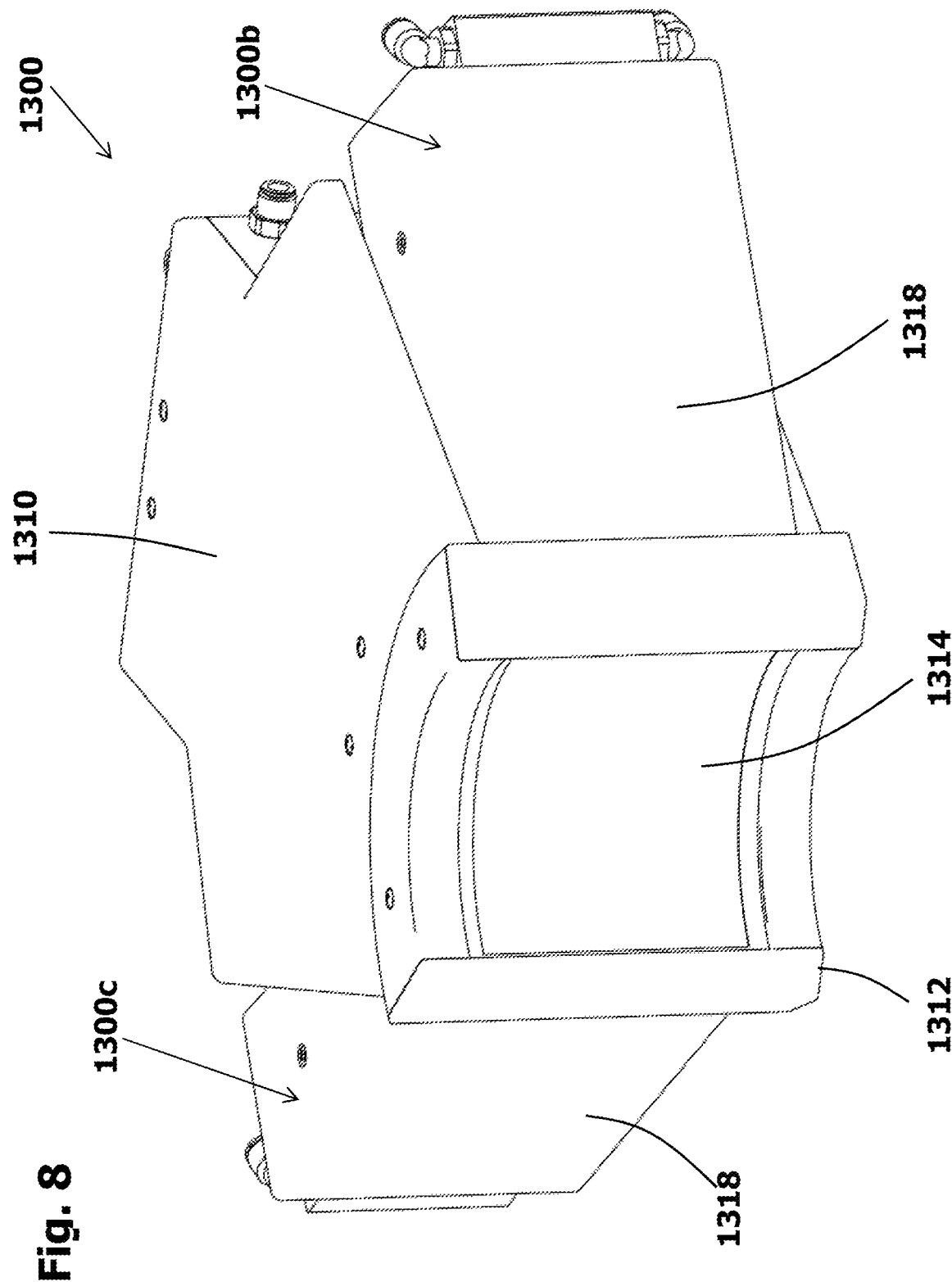
FIG. 8 is a three-dimensional front view of the X-ray detector of FIG. 4A.

In conjunction with FIGS. 8 and 9, the X-ray detector 1300 will be described in further detail. FIG. 8 illustrates a three-dimensional front view of the X-ray detector 1300 showing the casings 1310, 1318 for the detector modules 1300a, 1300b, 1300c as well as a curved window 1314 on the front side 1312 of the casing 1310. The curved window 1314 is transparent for X-rays. It may have a radius of curvature of 70 mm, or it may be flexible, changing its radius of curvature corresponding to the position of the modules inside.

Figure 9:
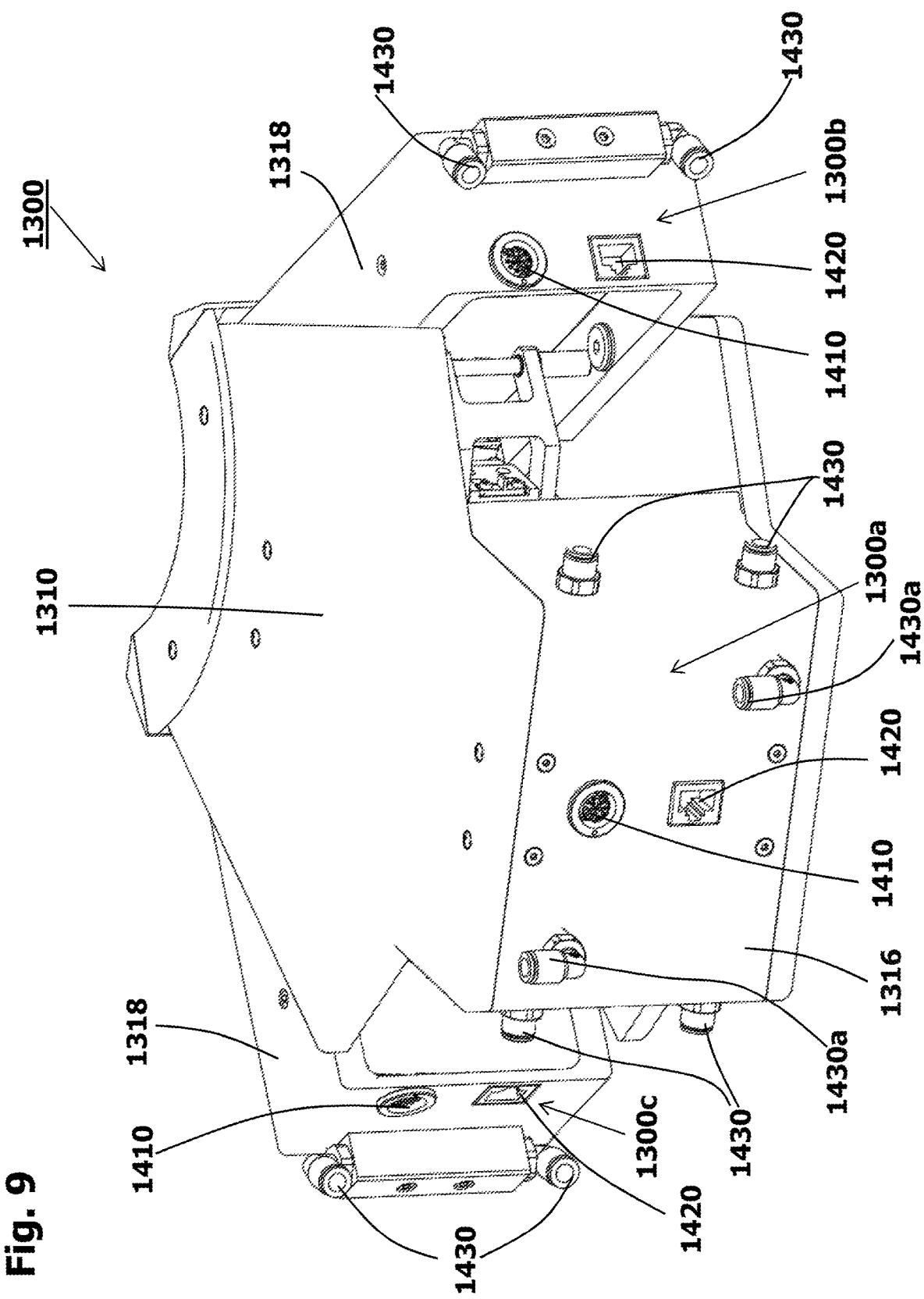
FIG. 9 is a three-dimensional rear view of the X-ray detector of FIG. 4A.

FIG. 9 illustrates a three-dimensional rear view of the X-ray detector 1300 showing the casings 1310, 1318 as well as different electrical connections 1410, 1420 for power supply and communication. Further shown are inlet and outlet ports 1430 for cooling gas or cooling fluid (e.g., cooling water) supply for cooling the readout electronics 1320 and/or the X-ray detection sensor 1322. For this purpose, a primary inlet port and outlet port 1430a is arranged at the rear end of the casing 1310 through which the detector 1300 can be coupled to an external cooling source (e.g., heat exchanger, not shown in FIG. 9). Moreover, secondary inlet and outlet ports 1430 are arranged at the lateral sides of the casing 1310 and at the rear ends of the housings 1318 of the laterally arranged detector modules 1300b, 1300c which are coupled by corresponding hoses 1432 (see FIG. 7) in order to realize a cooling circuit for the detector modules 1300a, 1300b, 1300c. The cooling fluid or cooling gas provided by the external cooling source flows from the cooling source to the central detector 1300a through the primary inlet port 1430a, and via the secondary inlet ports 1430 to the laterally arranged detector modules 1300b, 1300c. Further, the cooling fluid or cooling gas flows back via the secondary outlet ports 1430 to the primary outlet port 1430a, and from the primary outlet port 1430a to the cooling source. According to a further implementation not illustrated in FIG. 9, additional inlet and outlet ports may be provided at the rear or lateral end of the casing 1310 and/or the module housings 1318 in order to provide protective gas/vacuum for the X-ray detection sensors 1322 or the spaces surrounding the X-ray detection sensors 1322.

The detector modules 1300a, 1300b, 1300c described above are designed as separate detector modules with separate electronic components and electric connections 1410, 1420. According to an alternative implementation the different detector modules 1300a, 1300b, 1300c do not have to be designed as separate modules but can share different electronic components and electrical connections 1410, 1420. Moreover, according to one implementation, the detector modules may share a common power supply which is integrated in the casing 1310.

It is further noted that the claimed invention is not limited to the described implementations of three detector modules 1300a, 1300b, 1300c, wherein the central module 1300a is a fixed module (that is not pivotable), and only the laterally arranged modules 1300b, 1300c are pivotable with respect to the fixed module 1300a. According to alternative implementations, it is also conceivable that only two detector modules are provided, wherein the two detector modules are pivotable with respect to each other. According to a further embodiment, it is also conceivable that four or more detector modules are provided, wherein each detector module is pivotable to be arranged along a circle line surrounding the sample 300.

Figure 10:
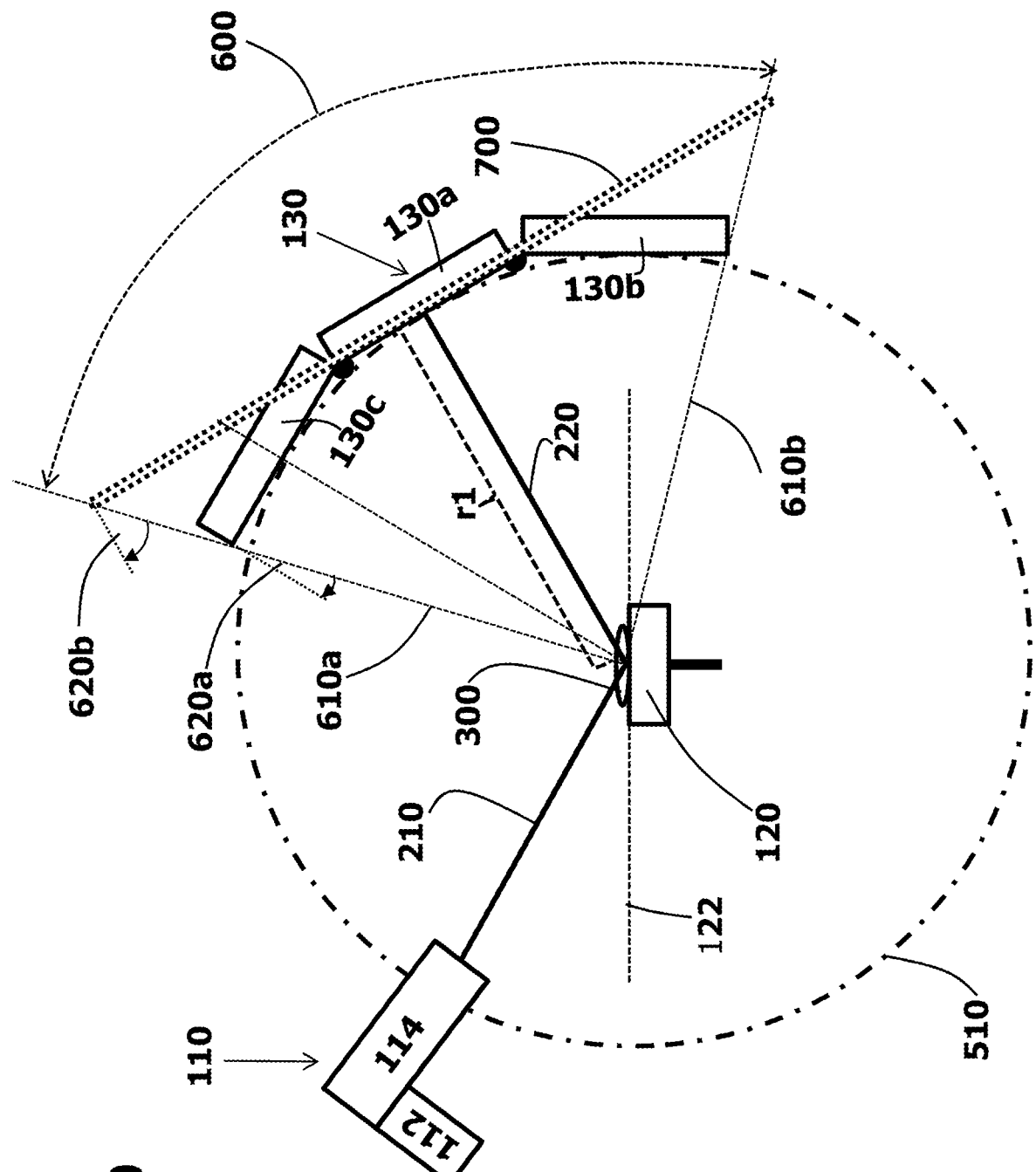
FIG. 10 is a schematic drawing comparing the X-ray detector with a conventional X-ray detector.

With reference to FIG. 10, the advantages of the present X-ray detector design is further discussed. The described X-ray detectors 130, 1300 have the following advantages compared to known detector designs. Due to the flexible arrangement of the detector modules 130a-c, 1300a-c along circle lines, each detector module (or X-ray detection sensor) has the same radial (perpendicular) distance to the sample 300 (see FIG. 10). This improves the measurement and facilitates data processing because each module provides measurement data having the same quality with respect to signal-to-noise-ratio and resolution. In contrast, a large single planar X-ray detector 700 which is designed to cover the same solid angle range 600 (defined by rays 610a and 610b in FIG. 10) has peripheral regions which are much farther away from the sample 300 as its central region. The scattered X-ray background intensity (unwanted X-ray intensity underneath the diffracted beams intensity) measured by the X-ray detector (or detector modules) is dependent on the radial distance (in an inverse square relationship) and therefore the large single planar X-ray detector 700 will exhibit images with a larger variation of measured background intensity from the center to the periphery. Whereas the articulated X-ray detector 130, 1300, having broadly the same radial distance across the modules 130a-c, 1300a-c will have a more nearly constant measured background across the images (or combined image) which will be more easily removed by software image processing to more accurately record the diffracted beams intensity.

Moreover, as shown in FIG. 10 diffracted beams 220 hit the detector modules 130a-c, 1300a-c at almost the same incidence angles 620a (i.e., angle of the diffracted beam in relation to the detector surface normal). That is, the incidence angles 620a do not considerably vary from the detector center to the detector periphery. The diffracted beams hit the peripheral regions of the large single planar X-ray detector 700 at larger oblique angles 620b (from the perpendicular direction) relative to the smaller oblique angles 620a of the articulated X-ray detector 130. The accuracy of the measurement of the X-ray intensity of a diffracted beam is dependent on the angle of incidence of the beam onto the detector surface. More oblique angles of incidence increase the imaged size of the diffracted beam on the detector surface, spreading the intensity across more pixels on the detective area. The measured intensity of the diffracted beam is the sum of the intensities recorded from that group of neighboring pixels. Since each pixel may have a slightly different sensitivity and different gain in readout electronics and furthermore each pixel may also measure a different intensity of X-ray background, it becomes more problematic to determine an accurate value for the diffracted beam intensity. Therefore a more accurate measurement of the diffracted beam intensity can be made when the angle of incidence has less variation from the center to the periphery of the detector module and when that angle is less oblique (that is, closer to the perpendicular direction) which is the case for the articulated X-ray detector 130 and is not the case for the large single planar X-ray detector 700.

Still further, with the present detector design, it is possible to cover at short distances to the sample the whole solid angle range of interest. Thus, no detector movement is required during measurement, and the measurement can be done in the shortest possible measurement time.

As a person skilled in the art will readily appreciate, the above description is meant as an illustration of an implementation of the principles of this invention. This description is not intended to limit the scope or application of this invention in that the invention is susceptible to modification, variation, and change, without departing from the spirit of this invention, as defined in the following claims.

The invention claimed is:

1. An X-ray detector for use in an X-ray analysis system for measuring X-ray beams diffracted by a sample to be investigated, comprising:
   at least two X-ray detector modules which are articulately connected to one another;
   a drive mechanism configured to position the at least two X-ray modules around a sample location; and
   a control unit configured to control the drive mechanism to move the at least two detector modules relative to one another such that the at least two detector modules are arranged around the sample location along a pre-calculated curved line having a curvature that depends on a selected radial distance between the X-ray detector and the sample location, wherein the control unit is configured to calculate the curvature, along which the at least two detector modules are arranged, in dependence of the selected radial distance between the X-ray detector and the sample location such that the sample location lies in the center of curvature of the curved line.

2. The X-ray detector according to claim 1, wherein the control unit is configured to increase the curvature of the curved line, along which the at least two detector modules are arranged, with decreasing radial distance between the X-ray detector and the sample location.

3. The X-ray detector according to claim 1, wherein the drive mechanism comprises at least one pivoting mechanism, and wherein moving the at least two detector modules comprises pivoting the detector modules relative to one another about a pivoting axis.

4. The X-ray detector according to claim 3, wherein the at least two detector modules are pivotable with respect to one another to form a joint detector surface having a curvature that depends on the selected radial distance of the X-ray detector to the sample location.

5. The X-ray detector according to claim 1, wherein the X-ray detector comprises at least three detector modules with a centered detector module and at least two laterally arranged detector modules, wherein the laterally arranged detector modules are articulately connected to the centered detector module at opposite sides thereof.

6. The X-ray detector according to claim 5, wherein the at least two laterally arranged detector modules are individually pivotable with respect to the centered module.

7. The X-ray detector according to claim 5, wherein the at least two laterally arranged detector modules are individually pivotable such that the laterally arranged detector module on one side of the centered detector module forms together with the centered detector module a first partial detector surface with a first curvature, and the laterally arranged detector module on the other side of the centered detector module forms together with the centered detector module a second partial detector surface with a second curvature.

8. The X-ray detector according to claim 1, wherein the drive mechanism comprises at least one pivoting mechanism configured to pivot the articulately connected detector modules such that a distance between adjacent detector modules along the curved line does not change when changing the curvature of the curved line.

9. The X-ray detector according to claim 1, wherein each of the at least two detector modules is designed as planar two-dimensional X-ray detector.

10. The X-ray detector of claim 1, wherein the at least two detector modules are designed to cover a 2θ range of at least 134 degrees.

11. The X-ray detector of claim 1, further comprising at least one of the following components:
   a casing for receiving the at least two detector modules; and
   a curved X-ray transparent window arranged in front of the at least two detector modules.

12. An X-ray analysis system, for performing X-ray diffraction on samples, comprising:
   an X-ray optical device configured to generate and image a beam of X-rays to a sample to be investigated;
   a sample stage configured to hold and orient the sample in a sample location relative to the incident X-ray beam; and
   an X-ray detector for measuring the scattered X-ray beams, the X-ray detector comprising:
      at least two X-ray detector modules which are articulately connected to one another, a drive mechanism configured to position the at least two X-ray modules around the sample location, and a control unit configured to control the drive mechanism to move the at least two detector modules relative to one another such that the at least two detector modules are arranged around the sample location along a pre-calculated curved line having a curvature that depends on a selected radial distance between the X-ray detector and the sample location, wherein the control unit is configured to calculate the curvature, along which the at least two detector modules are arranged, in dependence of the selected radial distance between the X-ray detector and the sample location such that the sample location lies in the center of curvature of the curved line.

13. A method of controlling operation of an X-ray detector used in an X-ray analysis system for measuring diffracted X-ray beams, the X-ray detector comprising at least two X-ray detector modules which are articulately connected to one another and a drive mechanism configured for moving the at least two detector modules relative to one another, the method comprising the following steps:

adjusting a radial distance between a sample to be investigated and the X-ray detector to equal a desired radial distance;

calculating a curved line in dependence of the adjusted radial distance of the X-ray detector to the sample, wherein the curvature of the calculated curved line is adjusted in dependence of the radial distance of the X-ray detector to the sample such that the sample lies in the center of curvature of the curved line; and moving the at least two detector modules relative to one another such that the at least two detector modules are arranged around the sample along the calculated curved line.

14. The method according to claim 13, further comprising the following step:

determining the desired distance on the basis of a received input signal.

15. A computer program product for controlling operation of an X-ray detector used in an X-ray analysis system for measuring diffracted X-ray beams, the X-ray detector comprising at least two X-ray detector modules which are articulately connected to one another and a drive mechanism configured for moving the at least two detector modules relative to one another, the computer program product being stored in a non-transitory computer readable recording medium and comprising program code portions for configuring a computer upon executing the program code portions to:

adjust a radial distance between a sample to be investigated and the X-ray detector to equal a desired radial distance;

calculate a curved line in dependence of the adjusted radial distance of the X-ray detector to the sample, wherein the curvature of the calculated curved line is adjusted in dependence of the radial distance of the X-ray detector to the sample such that the sample lies in the center of curvature of the curved line; and move the at least two detector modules relative to one another such that the at least two detector modules are arranged around the sample along the calculated curved line.

16. The computer program product of claim 15, further comprising program code portions for configuring the computer upon executing the program code portions to:

determine the desired radial distance on the basis of a received input signal.

\* \* \* \* \*